UNITED STATES PATENT OFFICE.

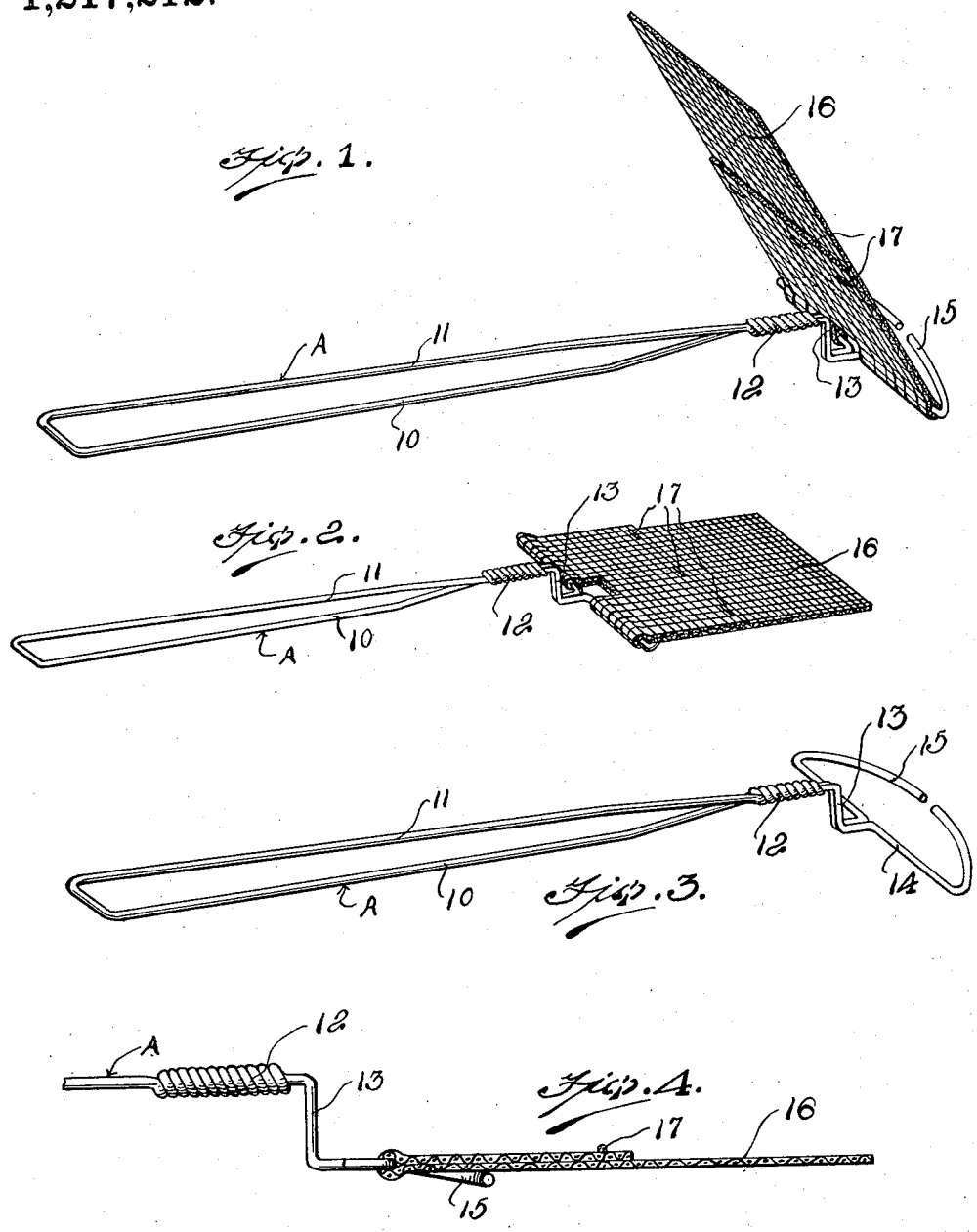

ELMER O. PITTS, OF COLBRAN, COLORADO.

FLY-SWATTER.

1,217,212. Specification of Letters Patent. Patented Feb. 27, 1917.

Application filed August 13, 1915. Serial No. 45,360.

*To all whom it may concern:*

Be it known that I, ELMER O. PITTS, a citizen of the United States, residing at Colbran, in the county of Mesa, State of Colorado, have invented certain new and useful Improvements in Fly-Swatters; and I do hereby declare the following to be a full, clear, and exact description of the invention, such as will enable others skilled in the art to which it appertains to make and use the same.

This invention relates to fly swatters.

The object of the invention is to provide a fly swatter in which the striking element is hingedly connected to a handle with the hinge of said element offset with respect to the handle.

A further object of the invention resides in the provision of a fly swatter in which the striking element will automatically adjust itself to the plane of the object against which it is engaged to effect the killing of a fly.

A still further object of the invention is to provide a fly swatter so constructed and arranged that it will not crush a fly between same and the surface to which the fly is clinging.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a perspective view of a fly swatter constructed in accordance with the invention with the striking element in one extreme position;

Fig. 2, a view similar to Fig. 1 with the striking elements in the other extreme position;

Fig. 3, a perspective view of the handle with the striking element removed, and

Fig. 4, a longitudinal section through the striking element.

Referring to the drawings the improved fly swatter is shown as comprising a handle A formed from a single length of wire bent upon itself to form arms 10 and 11. These arms are twisted as at 12 and have their free ends offset to form a shoulder 13. The terminal portions of the arm are bent laterally as at 14 in opposite directions and then curved inwardly as at 15 with their ends disposed substantially in abutting relation. These inwardly curved portions 15 form a seat or rest for the striking elements of the device.

This striking element is shown as comprising a sheet of wire mesh 16 which is bent around the portion 14 with the overlapping portions suitably riveted together as at 17. In this manner the striking element 16 is hingedly secured to the handle A.

In the use of the device the striking element 16 is positioned against the shoulder 13 as shown in Fig. 2. Upon slight striking movement being imparted to the device the element 16 will swing to the position shown in Fig. 1 and readily adapt itself to the plane of the object against which it is struck.

It will be noted that by hinging the element 16 it saves bending of the element in use of the device and thus greatly prolongs its life. As the weight of the element 16 falls upon the fly, and this usually is distributed over a considerable surface of the object whereon the fly rests, it is difficult to crush the fly with the swatter and with a little practice the operator can kill flys on the hardest surface without crushing them in the least.

What is claimed is:—

1. A fly swatter comprising a handle having an offset portion resulting in a shoulder, and a striking element hinged to and limited in movement in one direction by the offset portion and in the opposite direction by the shoulder.

2. A fly swatter comprising a handle formed from a single length of wire bent upon itself to produce resultant arms, said arms being twisted and having their outer terminal portions offset and bent laterally in opposite directions and then curved inwardly, and a striking element hingedly mounted on the laterally bent portions of the arms.

3. A fly swatter comprising a handle, laterally directed arms at one end of the handle, said arms being terminally rebent toward each other in spaced relation to the lateral portion, and a striking element hinged to the lateral portions of the arms, and limited in movement in one direction by the rebent portions thereof.

4. A fly swatter comprising a handle having an offset portion at one end resulting in a shoulder, said offset portion including a spaced member, and a striking element hinged to one member of the offset portion and engageable alternately with the other member thereof and with the shoulder whereby it will be limited in movement in opposite directions.

In testimony whereof, I affix my signature, in the presence of two witnesses.

ELMER O. PITTS.

Witnesses:
IRENE SCHULTZ,
HARRY DWYER.

Copies of this patent may be obtained for five cents each, by addressing the "Commissioner of Patents, Washington, D. C."